(No Model.)

J. RICHARDS.
SAFETY CLUTCH.

No. 584,483.  Patented June 15, 1897.

Witnesses.
H. P. Boyle.
A. V. Groupé

Inventor.
Joseph Richards
By Charles N. Butler
Attorney.

UNITED STATES PATENT OFFICE.

JOSEPH RICHARDS, OF PHILADELPHIA, PENNSYLVANIA.

SAFETY-CLUTCH.

SPECIFICATION forming part of Letters Patent No. 584,483, dated June 15, 1897.

Application filed January 16, 1897. Serial No. 619,454. (No model.)

*To all whom it may concern:*

Be it known that I, JOSEPH RICHARDS, a citizen of the United States, residing in the city and county of Philadelphia, State of Pennsylvania, have invented a new and useful Safety Coupling or Clutch, of which the following is a specification.

My invention relates to the transmission of power through shafting, and its object is to prevent the breakage of machinery which is abnormally obstructed. This is accomplished by placing on the transmitting-shaft or connecting the transmitting-shaft and the driven mechanism by a peculiar form of friction-coupling in which the frictional resistance between its relatively movable parts may be regulated to a degree sufficient to drive the mechanism in its normal operation, but insufficient to break the parts of the machinery in case of an obstruction which would cause an overstrain.

The invention is illustrated in the accompanying drawings, of which—

Figure 1:
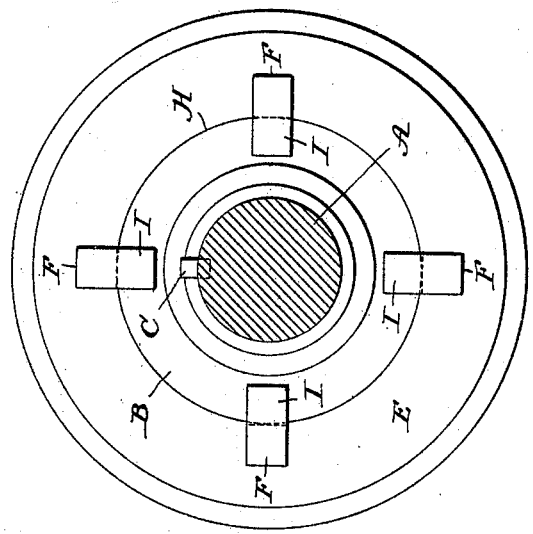
Figure 2:
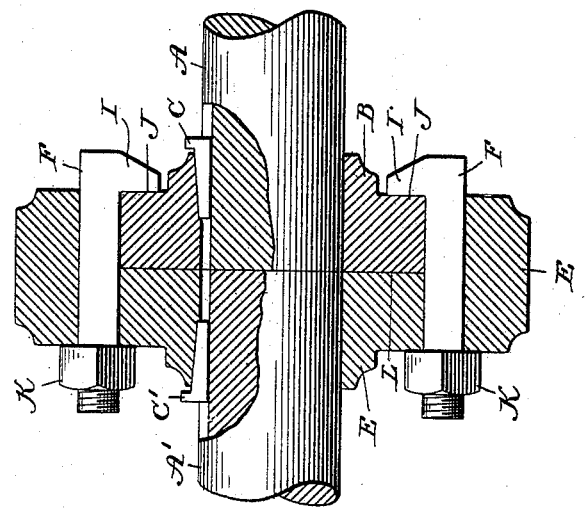

Figure 1 is a face view of the coupling, showing the relatively movable parts and the lugs for holding them in frictional engagement. Fig. 2 is a sectional view of the mechanism illustrated in Fig. 1, and Fig. 3 is a sectional view illustrating a specific form of the device.

Referring to Figs. 1 and 2, the driving-shaft A, rotated from any suitable source of power, is provided with a concentric cylindrical hub B, which is fixed on the end thereof, as by the spline C. The driven shaft A', in line with the driving-shaft, has a hub E fixed on its end, as by the spline C'. The hub E is provided with a cylindrical recess concentric with its shaft, in which the hub B fits and is adapted to rotate. Bolts F pass through the hub E, so that their inner edges lie outside of the cylindrical surface H and are provided with lugs I, which are adapted to bear against the outer face J of the hub B. By turning the nuts K of the bolts the lugs are brought into frictional engagement with the face of the hub B and the two hubs are frictionally locked together on the line L.

Figure 3:
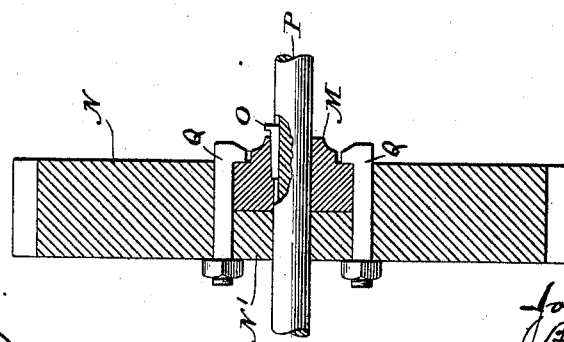

In the form of the invention illustrated in Fig. 3 the driving-shaft P extends through both the hub M and the gear-wheel or pulley N, the hub M being fixed on the shaft by the spline O, while the hub N' of the wheel is free to turn on the shaft. The wheel N is clutched to the hub M by means of the bolts Q, which hold this hub in frictional engagement with the recessed hub N' of the wheel. The gear-wheel thus engaged with the power-shaft P drives the machine in its usual operations, but in case of unusual obstruction the gear-wheel is brought to a stop while the power-shaft continues to revolve.

It will now be seen that if the mechanism operated by the power-shaft becomes choked by an obstruction sufficient to overcome the frictional resistance between the two hubs the driven mechanism will stop and breakage will be avoided, for the frictional resistance between the two hubs is made less than the breaking strain. As the bolts may be tightened or loosened to any degree desired, any desired degree of frictional resistance may be obtained and the parts clutched or unclutched at will.

This device is especially valuable in conveying machinery where obstructions frequently cause the breakage of the carrying-chain and the arms of the driving-wheel. It is also particularly useful in connection with rolling and grinding mills, where obstructions and consequent breakage are of frequent occurrence, as well as in all machinery subject to overstrains.

Having thus described my invention, I claim—

1. In a safety-clutch, a revoluble shaft, a cylindrical hub fixed thereon and having a bearing-surface at right angles to said shaft, a wheel having a cylindrically-recessed hub with a bearing-surface therein at right angles to said shaft, said wheel being loosely sleeved on said shaft and said first hub fitting within said cylindrically-recessed hub, a set of bolts provided with gripping-lugs fixed in said wheel without the periphery of said first hub and gripping the outer face thereof, whereby said bearing-surfaces are clutched in frictional engagement, as specified.

2. In a safety-clutch, a revoluble shaft, a cylindrical hub fixed thereon and having a plain bearing-surface at right angles to said shaft, a second hub recessed to receive said cylindrical hub and having a plain bearing-surface at right angles to said shaft, and a set of bolts provided with gripping-lugs fixed in said wheel without the periphery of said first hub and gripping the outer face thereof, whereby said bearing-surfaces are clutched in frictional engagement, as specified.

JOSEPH RICHARDS.

Witnesses:
I. G. DALY,
HARRY M. JACKSON.